United States Patent Office 3,647,846
Patented Mar. 7, 1972

3,647,846
METHOD FOR PROMOTING THE REACTION BETWEEN A SILICON-BONDED HYDROXYL RADICAL AND A SILICON-BONDED ALKOXY RADICAL
Robert C. Hartlein, Midland, and Carl R. Olson, Freeland, Mich., assignors to Dow Corning Corporation, Midland, Mich.
No Drawing. Filed Dec. 1, 1969, Ser. No. 881,287
Int. Cl. C07f 7/08
U.S. Cl. 260—448.2 E
11 Claims

ABSTRACT OF THE DISCLOSURE

Silicon-bonded hydroxyl radicals will react rapidly and completely in the presence of an organotitanate and an organic amine when the titanate and the amine are not premixed or added simultaneously. This method is useful in the preparation of compounds and polymers having Si—O—Si bonds.

---

This invention relates to a method for promoting the reaction between a silicon-bonded hydroxyl radical and a silicon-bonded alkoxy radical.

The reaction between a silicon-bonded hydroxyl radical and a silicon-bonded alkoxy radical have been catalyzed by amines and also by titanates. It has not been previously known to use a mixture of an amine and a titanate to catalyze the reaction between the silicon-bonded hydroxyl radical and the silicon-bonded alkoxy radical. It is not known in the prior art that there is any beneficial results obtained by using a mixture of an amine and a titanate to catalyze such a reaction. However, it is totally unexpected that the reaction between a silicon-bonded hydroxyl radical and a silicon-bonded alkoxy radical can be promoted by using an amine and a titanate when added separately. This, therefore, is the object of the present invention.

This invention relates to a method for promoting the reaction between a silicon-bonded hydroxyl radical and a silicon-bonded alkoxy radical comprising adding to a mixture of a silicon compound containing at least one silicon-bonded hydroxyl radical and a silicon compound containing at least one silicon-bonded alkoxy radical, an organotitanate and an organoamine wherein the organotitanate and the organoamine are added separately with a lapse of time of at least ten seconds between the additions whereby at least one new silicon-oxygen-silicon bond is formed.

The silicon compounds containing silicon-bonded hydroxyl radicals can be any silicon compound which has at least one silicon-bonded hydroxyl radical. Suitable silicon compounds containing silicon-bonded hydroxyl radicals can be illustrated by silanols such as trimethylsilanol, diphenylsilanediol, monophenylsilanetriol, octadecyldimethylsilanol, by organosilicon polymers such as hydroxyl endblocked polyorganosiloxane, hydroxylated organosiloxane resins and the like. The polymeric organosilicon compounds can be homopolymers, copolymers and mixtures thereof. Mixtures of polymeric organosiloxane compounds and silanols also illustrate useful compounds. Also illustrative of suitable silicon compounds are those which contain divalent hydrocarbon or substituted hydrocarbon radicals between the silicon atoms such as

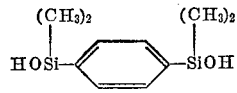

The silicon compounds containing at least one silicon-bonded hydroxyl radical are not critical and include all the known silicon compounds which have at least one silicon atom and at least one silicon-bonded hydroxyl radical.

The silicon compounds containing silicon-bonded alkoxy radicals can be any silicon compound which has at least one silicon-bonded alkoxy radical. Suitable silicon compounds containing silicon-bonded alkoxy radicals can be illustrated by alkoxysilanes such as methyltrimethoxysilane, trimethylmethoxysilane, phenyltrimethoxysilane, dimethyldimethoxysilane, vinyltriethoxysilane, allyltridecoxysilane, cyclohexyldimethylisopropoxysilane, tetraethoxysilane, tetrahexoxysilane, and naphthyltrimethoxysilane, and by polymeric organosilicon polymers, such as alkoxy endblocked polyorganosiloxanes, alkoxylated organosiloxane resins, polyethylsilicate, polybutylsilicate and the like. The polymeric organosilicon compounds can be homopolymers, copolymers and mixtures thereof. Mixtures of polymeric organosilicon compounds and alkoxysilanes also illustrate useful compounds. Also illustrative of the silicon compounds containing silicon-bonded alkoxy radicals are the silicon compounds which contain divalent hydrocarbon and substituted hydrocarbon radicals between the silicon atoms such as

The silicon compounds containing at least one silicon-bonded alkoxy radical are not critical and include all the known silicon compounds which have at least one silicon atom and at least one silicon-bonded alkoxy radical. The alkoxy radicals include any alkoxy radical such as methoxy, ethoxy, propoxy, isopropoxy, butoxy, pentoxy, hexoxy, decoxy, octadecoxy, cyclohexoxy, decenoxy, and the like.

The organotitanates include any of the well known soluble titanium compounds having titanium-oxygen bonds. The organotitanates include, for example, tetraethyltitanate, tetra-isopropyl titanate, tetra-n-butyl titanate, tetra-2-ehylhexyl titanate, tetraphenyl titanate, tetraoctadecyl titanate, tetra-12-octadecenyl titanate, triethanolamine titanate.

[(HOC$_3$H$_6$)$_2$N(CH$_2$)$_3$O]$_2$Ti[OCH(CH$_3$)$_2$]$_2$

[(CH$_3$CH$_2$)$_2$N(CH$_2$)$_2$O]$_4$Ti

[(C$_6$H$_{13}$)$_2$N(CH$_2$)$_6$O]$_2$Ti[OCH$_2$CH(CH$_3$)$_2$]$_2$

[C$_4$H$_9$NH(CH$_2$)$_4$O]$_4$Ti, (HOCH$_2$CH$_2$NHCH$_2$O)$_4$Ti tetrakistriethanolamine titanate-N-stearate, ethylene glycol titanate, Ti[OCH$_2$CH(CH$_2$CH$_3$)CH(OH)CH$_2$CH$_2$CH$_3$]$_4$ tetra(methylcellosolve) titanate, bis(acetylacetonyl)diisopropyl titanate,

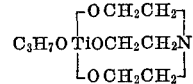

[HOOCCH(CH$_3$)O]$_4$Ti, [HOOC(CH$_2$)$_4$O]$_2$Ti(OH)$_2$ (CH$_3$COOCH$_2$O)$_4$Ti, (CH$_3$OOCCH$_2$O)$_4$Ti and diisopropyldiacetoxy titanate.

In addition, solvent-soluble partial hydrolyzates of any of the above titanates can be employed and, in addition, part or all of the organoxy radicals can be replaced by Z$_3$SiO— radicals wherein Z is a monovalent organic radical.

The organoamine can be a primary amine, a secondary amine or a tertiary amine. The amine can contain one or more amino groups and can also contain carbon-bonded siilcon atoms and other functional organic groups which are free of active hydrogen.

Specific examples of operative amines are: o-amino acetanilide, iminodiacetonitrile, m-aminoacetophenone, allylamine, N-methylallylamine, amylamine, N,N-dimethlyamylamine, aniline, p-bromoaniline, 2,6-dinitroaniline, m-fluoroaniline, sym-bis-gamma-aminopropyltetramethyldisoloxane, gamma(N-aminoethylamino)propyldiphenylmethylsilane, o-iodoaniline, o-nitroaniline, 2,3,4,5-tetrachloroaniline, o-anisidine, 9-anthrylamine, 4,4'-diaminoazobenzene, anthranilonitrile, benzylamine, p-methoxybenzylamine, decylamine, diallylamine, dicyclohexylamine, diethylenetriamine, difurfurylamine, di-m-tolylamine, beta-ethoxyethylamine, tetrahydrofurfurylamine, tetramethylguanidine, histamine, benzylhydrazine, p-bromobenzylhydrazine, 1-methyl-1-phenylhydrazine, 4,4-diaminohydrazobenzene, p₃-leucaniline, methylamine, morpholine, n-hexylamine, 5-nitronaphthylamine, 1,2-dimethyl-4 - pentenylamine, N,N - diethyl-p-phenylenediamine, piperazine, piperidine, butylamine, 2-aminopyridine, 6-nitro-o-toluidine, 2-amino-p-tolunitrile, 9-phenanthrylamine, and tribenzylamine.

The present invention is a method for promoting the reaction between a silicon-bonded hydroxyl radical and a silicon-bonded alkoxy radical as illustrated by the following equation:

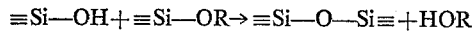

It is important that the organoamine and the organotitanate not be added at the same time. Either the organoamine is added and then the organotitanate is added after a lapse of a defined period of time of at least ten seconds, preferably 5 to 15 minutes, or the organotitanate is added first and then the organoamine is added after the lapse of a defined period of time. The organotitanate is preferably added first. The temperatures are not narrowly critical and can range from 0° C. to 200° C., preferably the temperatures range from room temperature to 100° C. The processes described herein are carried out under essentially anhydrous conditions unless otherwise stated.

The organotitanate when added first is preferably added to only a mixture of the silicon compound containing silicon-bonded hydroxyl radicals and the silicon compound containing silicon-bonded alkoxy radicals, since the addition of an organotitanate to a silicon compound containing silicon-bonded hydroxyl radicals without the presence of silicon-bonded alkoxy radicals will cause gellation. Thus, the organoamine can be added to a mixture of the silicon compound containing the silicon-bonded hydroxyl radicals and the silicon compound containing the silicon-bonded alkoxy radicals and after a lapse of at least ten seconds the organotitanate can be added, or the organoamine can be added to the silicon compound containing the silicon-bonded hydroxyl radicals and then the silicon compound containing the silicon-bonded alkoxy radicals can be added and thereafter after a lapse of at least ten seconds the organotitanate can be added, or the organoamine can be added to the silicon compound containing the silicon-bonded alkoxy radicals and then the silicon compound containing the silicon-bonded hydroxyl radicals can be added and thereatfer after a lapse of at least ten seconds the organotitanate can be added. The organotitanate can be added to a mixture of the silicon compound containing the silicon-bonded hydroxyl radicals and the silicon compound containing silicon-bonded alkoxy radicals and after a lapse of at least ten seconds the organoamine can be added or the organotitanate can be added to the silicon compound containing the silicon-bonded alkoxy radicals and then the silicon compound containing the silicon-bonded hydroxyl radicals can be added and thereafter after a lapse of at least ten seconds the organoamine can be added.

The method of the present invention is preferably carried out in an organic solvent, however, the reaction can be carried out without organic solvents but this is not recommended since practical problems are encountered such as some materials being liquid while others are solids and the like. Organic solvents suitable for use in the process include hydrocarbons such as heptane, cyclohexane, methylcyclopentane, benzene, toluene, xylene, naphtha and mineral spirits; halocarbons and halohydrocarbons such as perchloroethylene and chlorobenzene; ethers such as diethyl ether and methylamyl ether; halogenated ethers such as 2,2'-dibromodiethyl ether; esters such as butyl acetate and other solvents such as tetrahydrofuran, acetonitrile, ethylene glycol dimethyl ether and dimethylsulfoxide.

The weight ratio of the organotitanate and the organoamine can vary broadly. The organoamine can be used in an amount ranging from 1 to 100 inclusive parts by weight organoamine to 10 parts by weight organotitanate, preferably the organoamine is used in an amount of from 5 to 15 inclusive parts by weight organoamine to 10 parts by weight organotitanate.

The number of hydroxyl radical and alkoxy radicals on the silicon compounds is not critical except that there must be at least one of each. Depending upon the desired product the ratio between the hydroxyl radicals and the alkoxy radicals can be varied. For example, if it is desired to obtain an alkoxy functional product, the number of alkoxy radicals would be greater than the number of hydroxyl radicals.

The amount of total organoamine and organotitanate can vary broadly, from about 0.1 to 10 weight percent based on the total weight of the silicon compounds, preferably from 0.1 to 2 weight percent of total organoamine and organotitanate based on the total weight of the silicon compounds.

The products obtained by the method of the present invention can be used as obtained such as in solution or the volatiles including organic solvents, by-produced alcohols and excess volatile reactants can be removed by stripping the resulting product mixture under vacuum. Other conventional methods of recovering organosiloxane products can be used.

The method of the present invention is useful to prepare a variety of organosilicon compounds, especially alkoxy functional organosilicon compounds. The alkoxy functional polyorganosiloxanes prepared by this method have exceptionally good shelf stability whereas alkoxy functional polyorganosiloxanes prepared by other methods have poorer shelf lives and gel upon standing. The method of the present invention provides a means for causing the silicon-bonded hydroxyl radicals to react very fast with the silicon-bonded alkoxy radicals to produce new silicon-oxygen-silicon bonds. The reaction goes to completion rapidly even at room temperature.

The organosilicon compounds prepared by the method of the present invention are useful as intermediates in the preparation of silicone resins, rubbers and fluids, as air curing sealants, adhesives, as cross-linkers, and as coatings and film formers.

The following examples are only presented for illustrative purposes and should not be construed as limiting the present invention which is properly delineated in the claims. All of the processes in the preparations of the following examples are carried out under essentially anhydrous conditions unless otherwise stated.

EXAMPLE 1

To a mixture of 1 mole of diphenylsilanediol and 3 moles of methyltrimethoxysilane, 0.5 weight percent normal hexylamine was added and after one minute 0.5 weight percent tetraisopropyltitanate was added. The reaction produced was

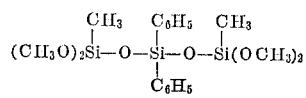

and there remained one mole of methyltrimethoxysilane unreacted. The catalyzed mixture was completely reacted after 30 minutes at 70° C. and after 4 hours at room temperature. The weight percentages were based on the total weight of the diphenylsilanediol and the methylthimethoxysilane.

EXAMPLE 2

(A) To a mixture of 780 g. of a hydroxyl endblocked polydimethylsiloxane having an average of 34 dimethylsiloxane units per molecule and 1408.8 g. of toluene, 166.2 g. of methyltri(methylethylketoxime)silane was added and allowed to react for 1.5 hours at room temperature. To the resulting monomethyldi(methylethylketoxime)siloxy endblocked polydimethylsiloxane toluene solution, 1338.0 g. of a solution of 65.5 weight percent hydroxylated phenylsiloxane resin having 90 mol percent monophenylsiloxane units and 10 mol percent phenylmethylsiloxane units in toluene was added and the resulting mixture was heated to 77° C. for one hour to produce a hydroxylated organosiloxane block copolymer having 4.5 weight percent silicon-bonded hydroxyl radicals in a toluene solution. This solution was cooled.

(B) To 400 g. of the above solution, 40 g. of a hydroxyl endblocked polyphenylmethylsiloxane having a viscosity of about 2 cs. at 25° C., and 72.1 g. of methyltrimethoxysilane was added. The mixture was then heated to 80° C. for 4 hours. No reaction was observed to have taken place at the end of the 4 hours of heating.

(C) To the solution of (B), 1 g. of normal hexylamine in 10 g. of toluene was added and the heating was continued for 4 more hours at 80° C. At the end of 4 hours 4.5 ml. of methanol distillate was recovered, which indicated that some reaction had taken place. After heating an additional one hour at 80° C., no further methanol was recovered.

(D) To a mixture identical to that of (B) above except 1 g. of tetraisopropyltitanate in 10 g. of toluene was added. After heating at 80° C. for 4 hours less than 1 ml. of methanol distillate was recovered.

(E) To the mixture of (C) 1 g. of normal hexylamine in 10 g. of toluene was added and after 50 minutes of heating at 80° C., 13 ml. of methanol distillate was recovered. Heating the mixture an additional one hour did not produce any additional methanol distillate. The product solution was stripped to 100° C. under reduced pressure to produce a methoxy functional organosiloxane block copolymer which cured at room temperature by adding tetraisopropyltitanate and exposing the mixture to ambient atmosphere. This methoxy functional organosiloxane block copolymer was an adhesive.

EXAMPLE 3

To a mixture of 17.5 pounds of a hydroxyl endblocked polydimethylsiloxane having an average of 34 dimethylsiloxane units per molecule and 56.8 pounds toluene, 3.9 pounds of methyltri(methylethylketoxime)silane was added and allowed to react for one hour at 30° C.

To the resulting monomethyldi(methylethylketoxime)-siloxy endblocked polydimethylsiloxane toluene solution, 35.4 pounds of a solution of 65.5 weight percent hydroxylated phenylsiloxane resin having 90 mol percent monophenylsiloxane units and 10 mol percent phenylmethylsiloxane units in toluene was added and the resulting mixture was heated at 80° C. for 40 minutes to produce a hydroxylated organosiloxane block copolymer having 4.5 weight percent silicon-bonded hydroxyl radicals in a toluene solution. This solution was cooled and then 11.7 pounds of methyltrimethoxysilane and 0.2 pound of tetraisopropyltitanate was added and the temperature of the solution increased to 47° C. Thereafter, 0.2 pound of normal hexylamine was added to the solution and the solution was heated to 80° C. for 30 minutes. Toluene and the by-produced methanol were removed by stripping at reduced pressure (20 mm. Hg) to 100° C. The resulting product was a monomethyldimethoxysiloxy endblocked organosiloxane block copolymer.

The resulting monomethyldimethoxysiloxy endblocked organosiloxane block copolymer was an adhesive. The adhesion to glass and aluminum was determined. The adhesion to glass was determined by butt joints, 1 inch by 0.25 inch, and the adhesion to aluminum was determined by lap shear joints, 1 inch by 1 inch. The test joints were prepared by applying a light coat of the methoxy functional block copolymer to each of the adherents which were then pressed together and left undisturbed for 24 hours. After 24 hours any excess of the block copolymer was removed and then the adhesive strength was determined after 7 days at room temperature. The adhesive strength was recorded as pounds per square inch as determined by the method ASTM–D–412–64T pulling at 2 inches per minute. The butt joints are placed together and allowed to cure whereas the lap shear joints are clamped together and then allowed to cure. The adhesive strength for glass was found to be 550 p.s.i. and the adhesive strength for aluminum was found to be 430 p.s.i. No corrosion was observed on the aluminum used in the adhesion determination.

EXAMPLE 4

A monomethyldimethoxysiloxy endblocked organosiloxane block copolymer was prepared as described in Example 3 except the amounts of the ingredients were as follows:

| | Parts by weight |
|---|---|
| Hydroxyl endblocked polydimethylsiloxane | 14.02 |
| Methyltri(methylethylketoxime)silane | 3.12 |
| Hydroxylated phenylsiloxane resin solution | 28.36 |
| Methyltrimethoxysilane | 8.65 |
| Titanium acetylacetonate instead of the tetraisopropyltitanate | 0.16 |
| Normal hexylamine | 0.16 |
| and | |
| Toluene | 45.51 |

The monomethyldimethoxysiloxy endblocked organosiloxane block copolymer obtained had the following physical properties after curing for 7 days at room temperature.

The methoxy functional block copolymer had a skin over time of 10 minutes and a tack free time of 45 minutes. The cured methoxy functional block copolymer had a durometer of 90 on the Shore A scale. The tensile strength was 780 p.s.i. at break and the elongation of 60 percent as determined by ASTM–D–412–64T procedure pulling at 2 inches per minute. The tear strength was 44 p.p.i. as determined by ASTM–D–624–54 procedure by pulling at 2 inches per minute on nickel bars.

EXAMPLE 5

To a mixture of 426.8 g. of a hydroxyl endblocked polydimethylsiloxane having an average of 34 dimethylsiloxane units per molecule and 963.5 g. of reagent grade toluene, 95.1 g. of methyltri(methylethylketoxime)silane was added and allowed to react for one hour at 25° C. To the resulting monomethyldi(methylethylketoxime)silane endblocked polydimethylsiloxane toluene solution, 1012.8 g. of a solution of 56.1 weight percent hydroxylated phenylsiloxane resin having 90 mol percent monophenylsiloxane units and 10 mol percent phenylmethylsiloxane units in toluene was added and the resulting mixture was allowed to react over a 1.5 hour period while the temperature increased from 25° C. to 81° C. to produce a hydroxylated organosiloxane block copolymer having 3 weight percent silicon-bonded hydroxyl radicals in a toluene solution. This solution was cooled to room temperature and 450.2 g. of methyltrimethoxysilane and 6.25 g. of tetraisopropyltitanate in 10 g. of toluene was added and the mixture was allowed to react for 30 minutes and increase in temperature to 51° C. Thereafter, 6.25 g. of normal hexylamine in 10 g. of toluene was added to this solution and the solution was heated to 95° C. for one hour and 45 minutes removing volatile materials such as the by-produced methanol. The resulting solution was then vacuum stripped to 125° C. The resulting product was a monomethyldimethoxysiloxy end-blocked organosiloxane block copolymer. To the monomethyldimethoxysiloxy endblocked organosiloxane block copolymer, 12.6 g. of tetraisopropyltitanate was added and the composition was sealed in tubes to prevent contact with moisture. The composition cures upon exposure to moisture but is entirely stable in the anhydrous condition.

EXAMPLE 6

A monomethyldimethoxysiloxy endblocked organosiloxane block copolymer was prepared as described in Example 5, except the ingredients were as follows:

| | Parts by weight |
|---|---|
| Hydroxyl endblocked polydimethylsiloxane having an average of 34 dimethylsiloxane units per molecule | 35.9 |
| Methyltri(methylethylketoxime)silane | 8.0 |
| Hydroxylated phenylsiloxane resin having 90 mol percent monophenylsiloxane units and 10 mol percent diphenylsiloxane units | 35.9 |
| Methyltrimethoxysilane | 20.2 |
| Tetraisopropyltitanate | 0.5 |
| Normal hexylamine | 0.5 |
| and to the final composition | |
| Tetrabutyltitanate | 0.5 |

The resulting composition was used to coat over a commercially available silicone rubber which was coated on a standard 100 watt incandescent light bulb. The light bulb was placed in a high dirt pick-up area for 9 days with the following results. The commercially available silicone rubber coating was used to provide a bulb which is safe when shattered. The light bulb remained clean after 9 days.

EXAMPLE 7

Example 5 was repeated except that with the methyltrimethoxysilane, 250.0 g. of a hydroxyl endblocked polydiorganosiloxane was added therewith. The hydroxyl endblocked polydiorganosiloxane had a viscosity of about 3 cs. at 25° C. and had dimethylsiloxane units and diphenylsiloxane units. The resulting methoxy functional organosiloxane block copolymer was curable to a coating useful to overcoat other cured silicone rubber.

EXAMPLE 8

A composition, as prepared in Examples 2(A) and (B), was prepared. To each of four such compositions, 0.5 weight percent tetraisopropyltitanate was added and after one minute an organoamine was added. The organoamine was added in an amount of 0.5 weight percent. The organoamines were (A) pyridine (B) aniline (C) triethylamine, and (D) dipropylamine. The amounts of methanol distillate recovered over a period of time was as follows:

| Amine | Time, minutes | Methanol distillate, g. |
|---|---|---|
| A. Pyridine | 60 | 13.2 |
| B. Aniline | 49 | 12.7 |
| C. Triethylamine | 55 | 18.6 |
| D. Dipropylamine | 15 | 11.3 |

The product in each case was equivalent to the product of Example 2.

EXAMPLE 9

When Example 1 is repeated and the tetraisopropyltitanate is added ten seconds after the normal hexylamine, equivalent results are obtained.

That which is claimed is:

1. A method for promoting the reaction between a silicon-bonded hydroxyl radical and a silicon-bonded alkoxy radical comprising adding to a mixture of a silicon compound containing at least one silicon-bonded hydroxyl radical and a silicon compound containing at least one silicon-bonded alkoxy radical, an organotitanate and an organoamine free of active hydrogen other than amine hydrogen and selected from the group consisting of primary amine, secondary amine and tertiary amine wherein the organotitanate and the organoamine are added separately with a lapse of time of at least ten seconds between the additions whereby at least one new silicon-oxygen-silicon bond is formed, said method being under essentially anhydrous conditions.

2. The method in accordance with claim 1 in which the organoamine is added first.

3. The method in accordance with claim 1 in which the organotitanate is added first.

4. The method in accordance with claim 1 in which the ratio of organoamine to organotitanate is from 1 to 100 parts by weight organoamine per 10 parts by weight organotitanate.

5. The method in accordance with claim 4 in which the total amount of organoamine and organotitanate is from 0.1 to 10 weight percent based on the total weight of the silicon compounds.

6. The method in accordance with claim 1 in which the reaction takes place in an organic solvent and the temperature is from 0° C. to 200° C. inclusive.

7. The method in accordance with claim 6 in which the temperature is from room temperature to 100° C. inclusive.

8. The method in accordance with claim 6 in which a product is recovered by removing the organic solvent and a by-product alcohol by vacuum stripping.

9. The method in accordance with claim 7 in which a product is recovered by removing the organic solvent and a by-produced alcohol by vacuum stripping.

10. The method in accordance with claim 5 in which the ratio of the organoamine to the organotitanate is from 5 to 15 parts by weight organoamine per 10 parts by weight organotitanate and the organoamine is a primary alkylamine having from 2 to 10 inclusive carbon atoms and the organotitanate is a tetraalkyl titanate having from 3 to 5 carbon atoms per alkyl radical.

11. The method in accordance with claim 10 in which the primary alkylamine is normal hexylamine and the tetraalkyltitanate is tetraisopropyltitanate.

References Cited

UNITED STATES PATENTS 3,105,061  9/1963  Bruner _____ 260—448.2 E UX
3,223,474  12/1965  Nitzsche et al. _ 260—448.2 E X DELBERT E. GANTZ, Primary Examiner P. E. SHAVER, Assistant Examiner U.S. Cl. X.R.

117—124 F; 260—46.5 G, 448.8 R